United States Patent [19]

Tsuge et al.

[11] 4,396,206

[45] Aug. 2, 1983

[54] VEHICLE LEVELING SYSTEM

[75] Inventors: Kazuo Tsuge, Yokohama; Youichi Mizutani, Hatano, both of Japan

[73] Assignee: Tokico Ltd., Kanagawa, Japan

[21] Appl. No.: 251,758

[22] Filed: Apr. 7, 1981

[30] Foreign Application Priority Data

Apr. 18, 1980 [JP] Japan .............................. 55-52819[U]

[51] Int. Cl.³ ............................................ B60G 17/04
[52] U.S. Cl. .................................... 280/711; 280/714;
55/180; 55/316
[58] Field of Search ................ 280/6 R, 6.1, 702, 711;
55/33, 35, 316, DIG. 17; 137/204; 180/41

[56] References Cited

U.S. PATENT DOCUMENTS

| | | | |
|---|---|---|---|
| 1,839,350 | 1/1932 | Slagel | 55/316 |
| 3,527,027 | 9/1970 | Knight et al. | 55/316 |
| 4,015,959 | 4/1977 | Grote | 55/316 |
| 4,130,487 | 12/1978 | Hunter et al. | 55/316 |
| 4,168,840 | 9/1979 | Graham | 280/6 R |

Primary Examiner—Robert R. Song
Assistant Examiner—Dennis Pedder
Attorney, Agent, or Firm—Oblon, Fisher, Spivak, McClelland & Maier

[57] ABSTRACT

A vehicle leveling system including a compressor, a leveler unit for lifting a vehicle body by compressed air from the compressor and an air dryer provided between filter casing filled with a filter element having moisture depositing function and a desiccant compartment filled with desiccant material. The filter casing is located on the side of the compressor while the desiccant compartment is located on the side of the leveler unit such that the filter casing has an area of air flow passage smaller than that of the desiccant compartment. The leveling system further includes a change-over valve which is connected to the air dryer on the side of the compressor to communicate the leveler unit selectively with either the compressor or atmosphere.

3 Claims, 3 Drawing Figures

VEHICLE LEVELING SYSTEM

BACKGROUND OF THE INVENTION

This invention relates to a vehicle leveling system which is provided with a compressor and a leveler unit for lifting a vehicle body by compressed air from the compressor.

It is known in the art to adjust the level of a vehicle body by feeding and discharging compressed air to and from a leveler unit which is mounted between sprung and unsprung mass of the vehicle. Compressed air is supplied to the leveler unit normally by means of a compressor which takes air from atmosphere. The air from atmosphere unavoidably contains moisture, which is condensed upon pressurization of air and causes troubles to the operation of the leveler unit if transferred thereinto along with compressed air.

In order to prevent moisture from being entrained in compressed air to be supplied to the leveler unit, it is known to provide between the compressor and leveler unit a moisture remover or air dryer, for example, from U.S. Pat. Nos. 3,667,775 and 3,784,220, which is filled with desiccant means such as silica gel or the like for separating and collecting moisture from compressed air. The air dryer of the latter patent removes moisture in the compressed air from the compressor in the pump-up phase of operation by adsorption on the desiccant, purging moisture from the desiccant by dry air in the exhaust phase of operation to permit regenerative repeated use of the desiccant.

However, under extremely humid conditions or in a case where air is compressed to a relatively high pressure, a large amount of water droplets is produced upon compression of intake air. Once a large amount of condensed water droplets is adsorbed on the desiccant, it becomes difficult to purge moisture sufficiently therefrom by contact with dry air in the regenerative stage and a substantial amount of moisture remains on the desiccant. If the dryer is repeatedly operated under such conditions, the desiccant soon becomes wet, resulting in an abrupt drop of its moisture adsorption capacity. Therefore, it has been general practice to resort to a heater for the purpose of accelerating the moisture purge from the desiccant in the regenerative stage or to replace the desiccant frequently.

SUMMARY OF THE INVENTION

With the foregoing in view, the present invention has as its object the provision of a vehicle leveling system employing an air dryer which is capable of drying compressed air sufficiently in repeated operations, securely preventing invasion of moisture into the leveler unit.

It is another object of the present invention to provide a vehicle leveling system employing an air dryer which is extremely simplified in construction and which is reliable in the operation of removing moisture from compressed air in the pump-up phase as well as in the operation of regenerative moisture purge from the desiccant material in the exhaust phase.

It is still another object of the present invention to provide a vehicle leveling system provided with an air dryer which prevents water droplets in compressed air from contacting the desiccant material by collecting them on the upstream side thereof.

It is a further object of the invention to provide a vehicle leveling system employing an air dryer which utilizes a differential air flow velocity distribution in the air dryer for purging moisture from the desiccant material sufficiently in the regenerative phase of operation.

It is a further object of the present invention to provide a vehicle leveling system employing an air dryer which prevents deteriorations in the moisture adsorbing capacity of the desiccant to reduce the frequency of its replacements.

According to the present invention, the above-mentioned objects are attained by a vehicle leveling system comprising: a compressor; a leveler unit for lifting a vehicle body by compressed air from the compressor; an air dryer provided between the compressor and leveler unit; the air dryer having a packed filter casing filled with a filter element possessing a moisture depositing function and a desiccant compartment filled with a desiccant material, the filter casing being located on the side of the compressor, the desiccant compartment being located on the side of the leveler unit, the filter casing having an air passage area smaller than that of the desiccant compartment; and a change-over valve connected to the air dryer on the side of the compressor for selectively communicating the leveler unit with either atmosphere or the compressor.

The above and other objects, features and advantages of the invention will become apparent from the following description, taken in conjunction with the accompanying drawings which show by way of example a preferred embodiment of the invention.

BRIEF DESCRIPTION OF THE DRAWINGS

In the accompanying drawings.

DESCRIPTION OF PREFERRED EMBODIMENT

Figure 1:
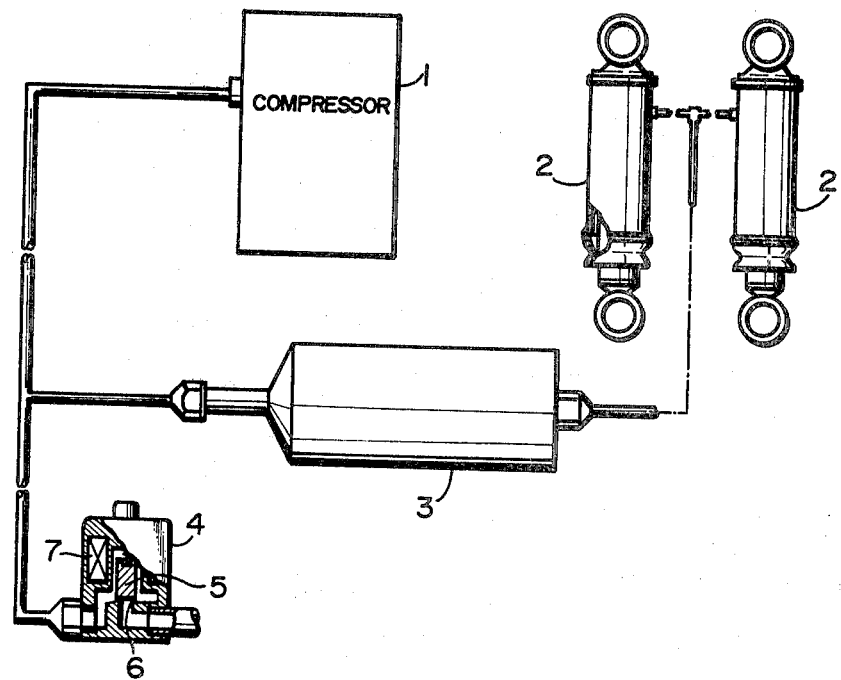
FIG. 1 is a schematic view of a vehicle leveling system according to the present invention.
Figure 2:
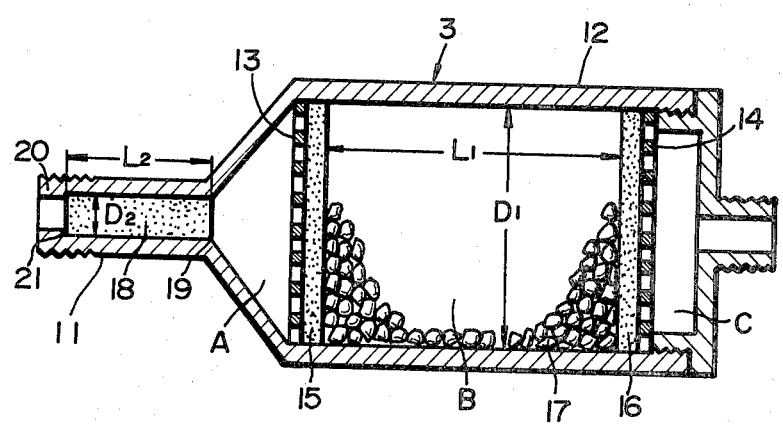
FIG. 2 is a schematic longitudinal section of the air dryer.

Referring to FIG. 1, there is shown a vehicle leveling system according to the present invention, which is constituted by a compressor 1, leveler units 2 mounted between a chassis and a vehicle body, an air dryer provided between the compressor 1 and leveler units 2, and a change-over valve 4 connected to the air dryer 3 on the side of the compressor 1.

The level of the vehicle is adjusted by feed and exhaust of compressed air to and from the leveler units 2, operating the compressor 1 or change-over valve 4 by electric or mechanical signal indicative of the displacements of the vehicle level detected by a vehicle level detector which is provided between the chassis and body of the vehicle. When the vehicle body is lowered by imposition of a load, the compressor 1 is driven by a signal from the vehicle level detector to draw air from atmosphere and supply compressed air to the leveler units through the air dryer 3. The leveler units 2 are expanded by the supply of compressed air until the vehicle body is lifted to a predetermined level, whereupon the operation of the compressor 1 is stopped. On the other hand, the change-over valve 4 which is a two-way valve as illustrated in FIG. 1 has its movable valve body 5 normally in closed state, seated on a valve seat 6. If the level of the vehicle body is lifted in an unloaded state, a solenoid coil 7 is energized by a signal from the vehicle level detector, attracting the valve body 5 into an open position to exhaust the compressed air in the leveler units 2 to atmosphere through the air dryer 3. By exhaust of compressed air, the leveler units 2 are contracted to lower the vehicle body until a predetermined level is reached, whereupon de-energizing the solenoid coil 7 to close the valve.

The above-mentioned compressor 1, leveler units 2, on-off valve 3 and vehicle level detector (not shown) may be of known constructions and therefore the present invention has no restrictions with regard to their constructions.

One feature of the present invention resides in that the air dryer which is provided between the compressor 1 and leveler units 2 is constituted by a packed filter casing 11 and a desiccant compartment 12. The filter casing 11 which is filled with a moisture depositing filter element is formed contiguously to one end of the desiccant compartment 12 on the side of the compressor 1. The desiccant compartment 12 is divided into three sections A to C by perforated plates 13 and 14. Filters 15 and 16 are provided in the center section B in contact with the perforated plates 13 and 14, respectively. The center section B is filled with a desiccant 17 such as, for example, silica gel which serves to adsorb moisture to dry compressed air from the compressor 1. The filters 15 and 16 are of glass wool, fibrous synthetic resin, sintered metal, wire mesh or the like which prevent the particles of the packed dessicant 17 from being carried away by the air flows. Hollow spaces are provided in the end sections A and C to ensure that the compressed air is uniformly contacted with the entire desiccant 17 on passage through the desiccant compartment.

The air dryer 3 has the packed filter casing 11 formed contiguously with the end section A of the desiccant compartment on the side of the compressor 1. A filter element 18 is inserted in the filter casing 11 from its inner end opening into the end section A, and abutted against a stepped wall at an open outer end 20 of the filter casing 11 on the side of the compressor 1. The filter element 18 is formed of glass wool, fibrous synthetic resin, sintered metal or other material which has moisture adsorbing property.

The packed center section B of the desiccant compartment 12 has an inner diameter $D_1$ which is greater than the inner diameter $D_2$ of the filter casing 11. Namely, the packed filter casing 11 has a smaller area of air passage than the desiccant compartment 12.

With the above-described vehicle leveling system, compressed air is supplied from the compressor 1 to the air dryer 3 in order to raise the level of the vehicle body. Although the compressed air contains a large amount of condensed water droplets, they are deposited on the filter element 18 along with the moisture content existing in the compressed air in supersaturated state when the compressed air is admitted into the air dryer 3 in contact with the filter element 18 of the packed filter casing 11. Thus, the compressed air is stripped of the water droplets and supersaturated moisture content before entering the end section A of the desiccant compartment 12. The compressed air is further dried upon passage through the filter 15, desiccant 17 and filter 16 of the desiccant compartment 12, sending dried air to the leveler units 2. Consequently, there is no possibility of the filter 15 being wetted with a large amount of moisture or of the desicant 17 being damped by direct contact with water droplets.

On the other hand, in order to lower the vehicle level, the on-off valve 4 is opened to release air in the leveler units 2 to atmosphere through the air dryer 3. At this time, the dry compressed air from the leveler units 2 absorbs moisture from the filter 16, dessicant 17 and filter 14 of the desiccant compartment 12 during passage therethrough and enters the packed filter casing 11 from the end section A, picking up the water droplets deposited on the filter element 18 before it is exhausted through the on-off valve 4.

In this manner, the moisture removal from the compressed air and regeneration of the dessicating materials including the desiccant and filter elements are repeated in the operation of the air dryer, preventing deteriorations of the moisture stripping capacities of the desiccant materials. In this instance, for the adsorption of atmospheric moisture on the desiccant 17 or for the moisture purge from the desiccant 17, it is more effective to pass air through dessicant 17 at a low velocity to prolong the contact time between the desiccant 17 and air. On the other hand, for the moisture deposition on the filter element 18, a low velocity is equally effective. However, in order to purge the deposited moisture from the filter element 18, air flows of higher velocity are effective for forcibly purging deposited moisture on the filter element 18 and exhausting same in an atomized state.

Since the leveler units 2 and air dryer 3 are already in pressurized state when compressed air is being fed from the compressor 1 to the leveler units 2, the volume of air which passes through the air dryer 3 is reduced under an increased pressure as compared with its volume in the exhaust phase under the atmospheric pressure, namely, the compressed air is reduced in volume and flow rate. As a result, the compressed air is passed through the filter element 18 and desiccant 17 at a lower velocity than under the atmospheric pressure to guarantee sufficient moisture adsorption on the filter element 18 and desiccant 17.

On the contrary, when the compressed air is exhausted from the leveler units 2, the valve 4 is opened to atmosphere and the pressure in the air dryer 3 is dropped accordingly. In addition, the packed filter casing 11 is formed in a diameter $D_2$ which is smaller than the diameter $D_1$ of the desiccant compartment 12, so that exhaust air flows through the filter element 18 at an extremely high velocity, carrying away and purging moisture from the filter element 18 in atomized state. While, in the desiccant chamber 12 of the larger diameter $D_1$, air flows at a low velocity to effect sufficient regenerative purge of the desiccant 17.

EXAMPLE

Figure 3:
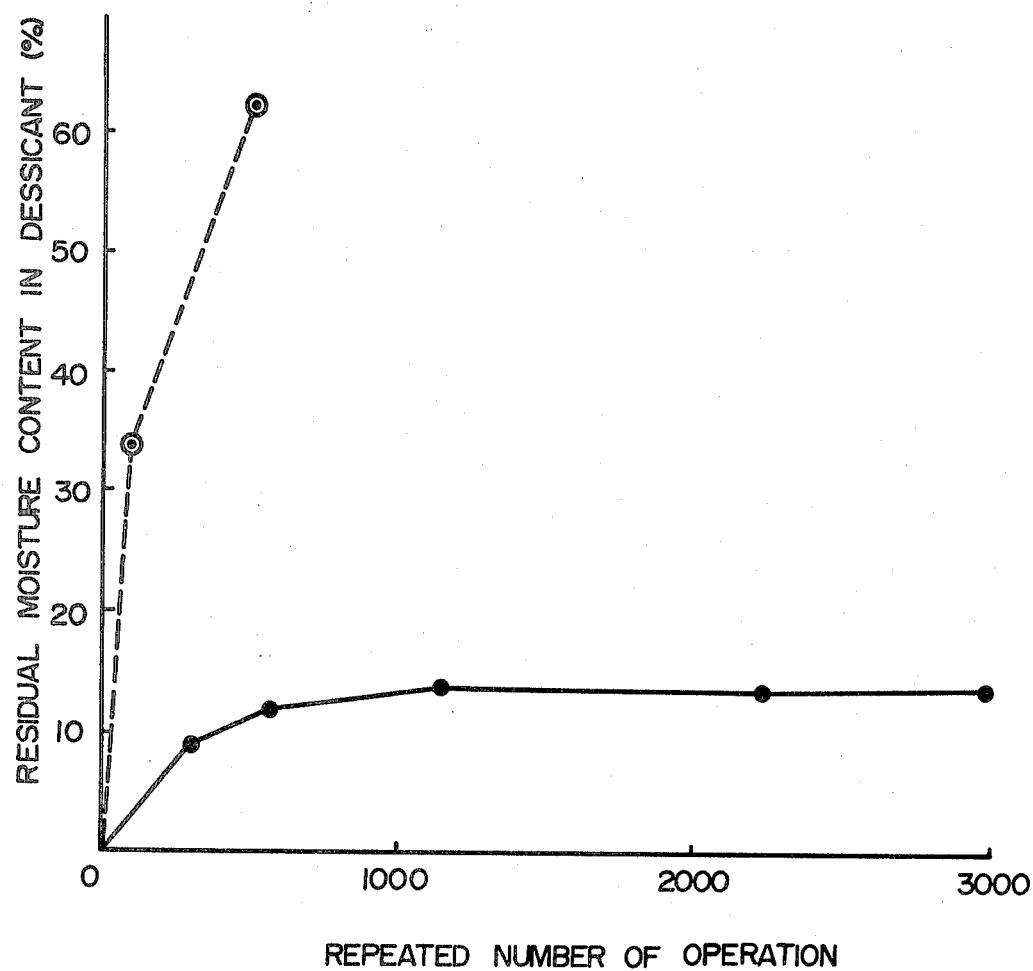
FIG. 3 is a graph showing the results of experiments of repeated operation by the air dryer according to the invention and a conventional air dryer.

For the vehicle leveling system according to the present invention, there was employed an air dryer 3 having a desiccant compartment 12 of a length $L_1$ 1.2 times greater than its diameter $D_1$ and a packed filter casing 11 of a diameter $D_2$ 1/5 of the diameter $D_1$ and $\frac{1}{2}$ of its length $L_1$, using glass wool for the filters 15 and 16 and the filter element 18. After a repeated operation test under the conditions of an ambient temperature of 40° C. and an ambient humidity of 90%, the residual moisture content in the desiccant was measured. The result is plotted in FIG. 3 by solid line.

COMPARATIVE EXAMPLE

A conventional air dryer of the same dimentions as in the foregoing Example but without the packed filter casing 11 was tested by a repeated operation in the same manner and under the same conditions as in Example. The result is plotted in FIG. 3 by broken line.

As clear from the results of the repeated operation tests, the residual moisture content in the air dryer of the vehicle leveling system of the invention is extremely small after the repeated operation, the air dryer retaining a satisfactory desiccant capacity and having a longer service life as compared with the conventional dryer.

What is claimed as new and desired to be secured by Letters Patent of the United States is:

1. A vehicle leveling system, comprising: a compressor;

a leveler unit for lifting a vehicle body by compressed air from said compressor;

an air dryer provided between said compressor and leveler unit, said air dryer consisting of a filter casing filled with a filter element having a moisture depositing property, a desiccant compartment filled with a desiccant material and filters provided at the opposite ends of said desiccant material, said filter casing and desiccant compartment being respectively located on the side of said compressor and leveler unit, wherein said filter element is kept spaced from both of said filters, and said filter casing having an air passage area smaller than that of said desiccant compartment; and a change-over valve connected to the filter casing of said air dryer on the side of said compressor for selectively communicating said leveler unit with one of said compressor and atmosphere, whereby air flows through said air drier in two directions.

2. A vehicle leveling system as set forth in claim 1, wherein the filter element filled in said filter casing is formed of a material selected from glass wool, a fibrous synthetic resin and sintered metal.

3. A vehicle leveling system as set forth in claim 1, wherein said desiccant compartment is longitudinally divided into three sections by perforated plates and said desiccant material and filters are filled in a center section of said desiccant compartment.

* * * * *